United States Patent
Willems et al.

[11] Patent Number: 5,448,828
[45] Date of Patent: Sep. 12, 1995

[54] PROCESS FOR PREPARING WEAR-RESISTANT EDGES ON TURBINE BLADES

[75] Inventors: Christian Willems, Dipl.-Ing. Werkstofftechniker; Axel C. D. Luckow, Kaufmännischer Angestellter, both of Germany

[73] Assignee: Thyssen Industrie AG, Essen, Germany

[21] Appl. No.: 221,416

[22] Filed: Mar. 31, 1994

[30] Foreign Application Priority Data

Apr. 2, 1993 [DE] Germany .................. 43 10 896.2

[51] Int. Cl.6 ............................................. B23P 15/00
[52] U.S. Cl. .................................. 29/899.1; 29/889.71
[58] Field of Search ............... 29/889.1, 889.7, 889.71, 29/889.72; 228/119, 195

[56] References Cited

U.S. PATENT DOCUMENTS

| | | | |
|---|---|---|---|
| 4,155,152 | 5/1979 | Crettella et al. | 29/889.1 |
| 4,611,744 | 9/1986 | Fraser et al. | 228/119 |
| 4,822,248 | 4/1989 | Wertz et al. | 29/889.1 |
| 5,048,183 | 9/1991 | Cang et al. | 228/119 |
| 5,071,054 | 12/1991 | Dzugan et al. | 29/889.1 |
| 5,156,321 | 10/1992 | Liburdi et al. | 228/119 |
| 5,210,946 | 5/1993 | Monroe | 29/889.1 |
| 5,348,446 | 9/1994 | Lee et al. | 29/889.72 |

FOREIGN PATENT DOCUMENTS

| | | |
|---|---|---|
| 0249092B1 | 3/1990 | France . |
| 2663343 | 6/1990 | France . |
| 0247582B1 | 1/1991 | France . |
| 0282831B1 | 10/1991 | France . |

*Primary Examiner*—Irene Cuda
*Attorney, Agent, or Firm*—McGlew and Tuttle

[57] ABSTRACT

A process for preparing wear-resistant edges (3) on turbine blades, e.g., in the area of the upper leading edge of the blade and on the cover sheet, preferably for steam turbines made of chromium steels and/or titanium-based alloys includes preparing a recess (2) on the corresponding area of the blade (1), preferably by forging or machining, prior to the application of the edge protection (3), applying a powder layer in the corresponding area by low-pressure plasma spraying or according to the encapsulation technique, and subsequently compacting the powder layer by hot isostatic pressing (HIP), and the diffuse binding to the base material of the blade is thus achieved.

16 Claims, 1 Drawing Sheet

PROCESS FOR PREPARING WEAR-RESISTANT EDGES ON TURBINE BLADES

FIELD OF THE INVENTION

The present invention pertains to a process for preparing wear-resistant edges on turbine blades, e.g., in the area of the upper leading edge of the blade and on the cover sheet, preferably for steam turbines made of chromium steels and/or titanium-based alloys.

BACKGROUND OF THE INVENTION

To protect the blade edges of steam turbine blades mainly from erosive attack, these must be provided with a special edge protection. In the case of turbine blades made of chromium steels, this edge protection is achieved by, e.g., inductive hardening, which is technically sufficient in most cases.

According to EP 0,282,831 B1, the edge protection consists, in the case of turbine blades made of titanium alloys, of a heterogeneous powder mixture containing ca. ⅓ part by weight of titanium carbide, titanium nitride or titanium boride, as well as non-oxidizable, martensitic or austenitic-martensitic steel, which mixture is melted by a laser beam, and which is separated from the base material by a sublayer consisting of pure vanadium powder, which is also melted by a laser beam and has a thickness of at least 1 mm.

EP 0,247,582 B1 discloses a process for applying a protective layer to a turbine blade made of a vanadium-containing titanium alloy, according to which a vanadium powder, used as an intermediate layer, is first heated and melted inductively by means of a mobile inductor, and a layer consisting of a cobalt-chromium-tungsten alloy, which is also premelted inductively from a powder, is applied to it.

EP 0,249,092 B1 discloses the soldering of a sintered and mechanically compacted protective cap consisting of a titanium carbide-containing iron-base alloy with high chromium and cobalt contents by means of a thin sheet with a thickness of 70–150 mm based on copper under vacuum or an inert gas at 900°–950° C.

Finally, FR 2,663,343 B1 discloses the preparation of a composite according to the powder metallurgical technology, welding or other methods, such as sintering or hot isostatic pressing. This composite is likewise applied for protecting the turbine blade edge according to temperature-supported processes, e.g., soldering.

Disadvantages, such as intense local heating to above the melting point, mixing, structural changes, internal stresses, relatively coarse weld structures tending to undergo segregation, reduction in the dynamic characteristics of the component, and sometimes the unintended formation of local cells, arise from a metallurgical viewpoint and from the viewpoint of component engineering.

SUMMARY AND OBJECTS OF THE INVENTION

It is an object of the present invention to propose a new process for preparing wear-resistant edges on turbine blades, preferably for steam turbines made of chromium steels and/or titanium-based alloys, in which a powder metallurgical edge protection, which is optimally adapted to the subsequent load from the viewpoint of material engineering and avoids the above-described disadvantages, is prepared.

According to the invention, a process for preparing wear-resistant edges on turbine blades for example in the area of the upper leading edge of the blade and on the cover sheet, preferably for steam turbines made of chromium steel and/or titanium-based alloys is provided. The process includes preparing a recess on the corresponding area of the blade, preferably by forging or machining. Subsequently, a powder layer is applied to the corresponding area of the blade by low-pressure plasma spraying, or by a known encapsulation technique. The powder layer is subsequently compacted by hot isostatic pressing, as a result of which a diffuse binding to the base material of the blade is achieved.

The application of the powder layer by the encapsulating technique includes providing a cavity for the powder, which forms a subsequent edge protection after the hot isostatic pressing process. This cavity is formed above the recess by welding a plate, which is larger by the shrinkage volume, to the blade in the area of the edge protection. This plate is removed after the hot isostatic pressing.

It is a further object of the present invention to apply prior-art powder metallurgical process steps, e.g., powder preparation, encapsulation technique, hot isostatic pressing (HIP), and low-pressure plasma spraying.

To apply the edge protection to the turbine blade edge, the blade has a recess in the area in which the edge protection is to be arranged. This recess may be forged on or prepared by machining.

To form a cavity, into which the powder forming the subsequent edge protection is filled and then compacted almost to the theoretical (maximum) density during the HIP (hot isostatic pressing) process, a plate, which is larger by the shrinkage volume, is welded onto the blades in the area of the edge protection. To prevent a structural change due to the capsule welding process from taking place, it proved to be favorable for the blades to have welded edges (beads), which project beyond the normal blade geometry and are also removed during the subsequent processing for preparing the final blade geometry. These welded edges can be forged onto the blank.

The hot isostatic pressing is advantageously performed with the parameters under which plasticization and diffuse binding both within the edge protection material (powder) and between the edge protection material and the base material of the blade lead to a firm, pore-free bonding of the particles and the layer.

As an alternative to the introduction of the powder into a cavity arranged above the recess (encapsulation technique), low-pressure plasma spraying offers another possibility of applying the powder. Layers of sufficient thickness can thus be applied, so that a subsequent HIP process can be performed even without encapsulation for further compaction and diffuse binding. As a result, the necessary powder layer can be applied without problems in the case of various powders or powder combinations.

Chromium steels and titanium-based alloys have proved to be suitable as blade materials. An edge protection to be applied according to the powder metallurgical process should therefore consists of a material (or a combination of materials) which consist of at least a proportionate amount of a material of the same type or a similar type as the blade material or which permits solid-state diffusion via solution equilibria based on the metallurgical conditions, to engage in a diffuse binding. In the case of the material combination, it is conceivable that powders which react during the HIP process to form intermetallic compounds are used. It is also possible to add additional hardening phases (e.g., hard materials), directly to the powder. The effectiveness of the subsequent edge protection depends, on the one hand, on the structure formed in the particle composite, i.e., the shape, size, distribution, etc., of the individual structural components (phases and defect structure), and, on the other hand, on the stratified bonding between the edge material and the blade material, which can be achieved by adapting the coefficients of thermal expansion to reduce internal stresses in the boundary layer.

Suitable materials/material combinations for the edge protection of chromium steel blades include, e.g.,
1. stellites,
2. CrxCy blends,
3. NiCrBSi alloys, and
4. metal/ceramic grades, Suitable materials/material combinations for the edge protection of blades made of titanium-based alloys, some of which were also mentioned in the documents cited above, include, e.g.,
1. Ti/TiC,
2. TiAl6V4/TiC,
3. Ti(X,Y,Z,U,V), in which X, Y, Z=(Al, Si, V, Zr, W, Ta, Cr . . . ) and U, V=(B, O, C, N), in which X, Y, Z, U, V>0.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
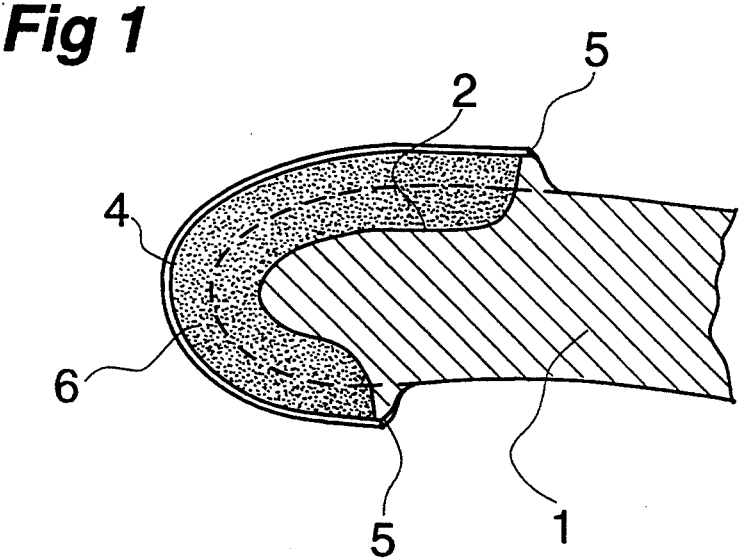
FIG. 1 is a cross sectional view showing a turbine blade in a pre-completion stage according to the process.

Referring to the drawings in particular, the invention comprises a process for preparing wear-resistant edges on turbine blades such as the upper leading edge of a blade 1 and on the cover sheet, preferably for steam turbines made of chromium steel and/or titanium-based alloys. The process includes preparing a recess 2 on the corresponding area of the blade, preferably by forging or machining. Subsequently, a powder layer 6 is applied to the corresponding area of the blade by low-pressure plasma spraying, or by a known encapsulation technique. The powder layer 6 is subsequently compacted by hot isostatic pressing, as a result of which a defuse binding to the base material of the blade is achieved.

The application of the powder layer 6 by the encapsulating technique includes providing a cavity for the powder, which forms a subsequent edge protection after the hot isostatic pressing process. This cavity is formed above the recess by welding a plate, which is larger by the Shrinkage volume, to the blade in the area of the edge protection. This plate is removed after the hot isostatic pressing.

Figure 2:
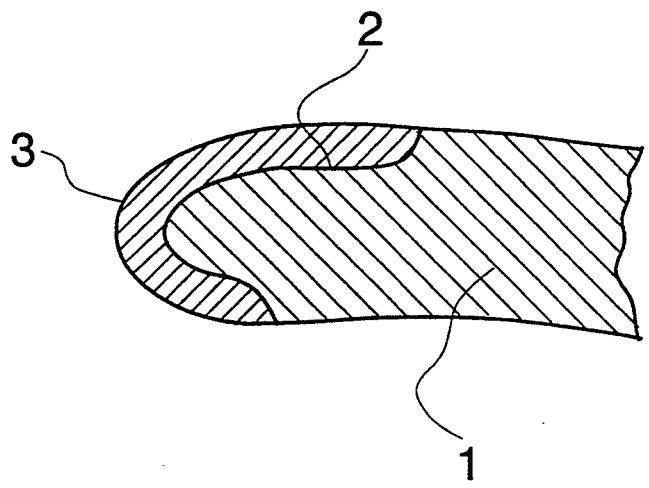
FIG. 2 is a cross sectional view showing the finished turbine blade according to the process of the invention.

FIG. 1 shows schematically the tip of a blade 1 with projecting welded edges 5, to which a capsule plate 4 is welded. The cavity between the capsule plate 4 and the recess 2, as well as the welded edges 5 is filled with the intended powder 6 as completely as possible prior to the HIP process. After the HIP process and the subsequent processing, performed to obtain the final blade geometry, the blade 1 has, together with the edge protection 3, the shape shown in FIG. 2, which is indicated by broken lines in FIG. 1.

While a specific embodiment of the invention has been shown and described in detail to illustrate the application of the principles of the invention, it will be understood that the invention may be embodied otherwise without departing from such principles.

What is claimed:

1. A process for preparing wear-resistant edges on turbine blades, such as an upper leading edge of a turbine blade and on a cover sheet, such as steam turbines made of chromium steel and/or titanium-based alloys, comprising the steps of:
    a) preparing a recess preferably by forging or machining, on an area of the blade to be treated;
    b) applying a powder layer to the area of the blade to be treated by low-pressure plasma spraying or according to the encapsulation technique; and
    c) subsequently compacting by hot isostatic pressing (HIP), as a result of which a diffuse binding to the base material of the blade is achieved.

2. Process in accordance with claim 1, wherein said step of applying the powder layer according to the encapsulation technique includes forming a cavity for the powder, which forms the subsequent edge protection after the HIP process, above the recess by welding a plate, which is larger by the shrinkage volume, to the blade in the area of the edge protection, and removing this plate after the HIP process.

3. Process in accordance with claim 2, wherein said step of welding the plate includes providing the blade with welded edges (beads), and removing the welded edges during the subsequent processing to prepare the final blade geometry.

4. Process in accordance with claim 1 or 2, wherein the powder layer to be applied consists of a material (or a material combination) which consists essentially, at least proportionately, of a material of the same type or a similar type as the blade material.

5. Process in accordance with claim 1 or 2, wherein the powder layer to be applied is selected in relation to the blade material to be such that solid-state diffusion via solution equilibria will be possible.

6. Process in accordance with claim 1 or 2, wherein powders which react during the HIP process to form intermetallic compounds are used.

7. Process in accordance with claim 1 or 2, wherein harder phases, preferably hard materials, are added to the powder.

8. Process in accordance with claim 1 or 2, wherein powders consisting essentially of stellite or CrxCy blends or NiCrBSi alloys or metal-ceramic grades are used for the edge protection of blades made of chromium steel.

9. Process in accordance with claim 1 or 2, wherein powders consisting essentially of Ti/TiC or TiAl6V4/TiC or Ti(X,Y,Z,U,V), in which X, Y, Z=(Al, Si, V, Zr, W, Ta, Cr . . . ) and U, V=(B, O, C, N), in which X, Y, Z, U, V>0, are used for the edge protection of blades made of titanium-based alloys.

10. A process for preparing wear resistant edges on turbine blades, such as an upper leading edge of a turbine blade and on a cover sheet, such as turbine blades having a base material formed of chromium steel and/or titanium-based alloys, comprising the steps of:
- preparing a recess by forging or machining, the recess being on an area of the blade to be treated;
- applying powder to an area of the blade to be treated, said step of applying powder including one of low-pressure plasma spraying or applying powder using an encapsulation technique, the applied powder forming a layer which protrudes beyond an intended blade geometry; and
- subsequent to said step of applying powder, compacting said powder by hot isostatic pressing (HIP) and achieving a diffuse binding of the powder to the base material of the blade.

11. A process according to claim 10, wherein said step of applying powder includes applying an amount of powder for compacting said powder, by said hot isostatic pressing, to nearly a theoretical maximum density.

12. A process according to claim 11, wherein said step of compacting includes determining an amount of powder which will form an edge with substantially said intended blade geometry, when said powder is compacted to nearly said theoretical maximum density.

13. A process according to claim 10, wherein said powder is formed of a material which is substantially the same type or a similar type to said base material.

14. A process for preparing wear resistant edges on turbine blades, such as an upper leading edge of a turbine blade and on a cover sheet, such as turbine blades having a base material formed of chromium steel and/or titanium-based alloys, comprising the steps of:
- preparing a recess by forging or machining, the recess being on an area of the blade to be treated;
- applying powder to an area of the blade to be treated, the applied powder forming a layer which protrudes beyond an intended blade geometry; and
- subsequent to said step of applying powder, compacting said powder by hot isostatic pressing (HIP) to nearly a theoretical maximum density and achieving a diffuse binding of the powder to the base material of the blade.

15. A process according to claim 14, wherein said step of applying powder includes low-pressure plasma spraying of said powder.

16. A process according to claim 13, wherein said step of applying powder includes applying powder with an encapsulation technique including providing a capsule plate enclosing a volume greater than a volume of said intended geometry of said edge and filling the volume of the powder.

* * * * *